US006473795B1

(12) United States Patent
Danielson et al.

(10) Patent No.: US 6,473,795 B1
(45) Date of Patent: *Oct. 29, 2002

(54) IN-BAND/OUT-OF-BAND ALERT DELIVERY SYSTEM

(75) Inventors: Lin-Juan L. Danielson, Tomball, TX (US); Patrick E. Dobyns, Garland, TX (US); Thomas J. Hernandez, Houston, TX (US); Ronald A. Neyland, Spring, TX (US); Richard A. Stupek, Houston, TX (US); James E. Barron, Spring, TX (US); Cheryl X. Chen, Tomball, TX (US); Andrew J. Miller, Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/089,040

(22) Filed: Jun. 2, 1998

Related U.S. Application Data

(63) Continuation of application No. 08/562,780, filed on Nov. 27, 1995, now Pat. No. 5,764,886, which is a continuation-in-part of application No. 08/250,651, filed on May 27, 1994, now abandoned, which is a continuation-in-part of application No. 07/720,258, filed on Jun. 24, 1991, now abandoned.

(51) Int. Cl.[7] .............................................. G06F 13/00

(52) U.S. Cl. ...................... 709/224; 709/217; 709/219; 709/223; 709/100

(58) Field of Search ................................. 709/100, 200, 709/201, 203, 217, 219, 221, 223, 224; 714/47, 48, 15

(56) References Cited

U.S. PATENT DOCUMENTS

| 3,996,423 A | 12/1976 | Colton et al. ................. 179/15 |
| 4,298,860 A | 11/1981 | Norberg et al. ............. 340/825 |

(List continued on next page.)

FOREIGN PATENT DOCUMENTS

| WO | WO-83-01851 | 5/1983 |
| WO | WO 88-06822 | 9/1988 |

OTHER PUBLICATIONS

Bellamah, "Beyond the Hype," *EISA Shows Promise For Users, PC Week*, Sep. 19, 1988 v5 n38, p (5)(1).

Kane, *Compaq Systempro Heralds New Generation of Multiprocessor PCs, PC Magazine*; Feb. 27, 1990; v9 n4 p 33(3).

Sullivan, et al., *LAN Entries to Shine at Comdex: car vendors join bus wars, PC Week*, Nov. 13, 1989, v6 n45 p. 77(2).

*Primary Examiner*—Majid Banankhah
(74) *Attorney, Agent, or Firm*—Sharp, Comfort & Merrett, P.C.

(57) ABSTRACT

An in-band/out-of-band alert delivery system for a computer system manager includes an alert log which maintains a record of alerts to be delivered and the status of those alerts, an alert manager for making a first attempt to deliver each alert, and a retry manager for making subsequent attempts to deliver alerts as becomes necessary and appropriate. The alert delivery system may also include a bus master interface manager for making in-band alert deliveries and a communications manager for making out-of-band alert deliveries. Telephone numbers are provided to the communications manager by an alert destination list. Out-of-band alert deliveries may be made via a modem, a universal asynchronous receiver transmitter, or the like.

18 Claims, 4 Drawing Sheets

U.S. PATENT DOCUMENTS

| | | | |
|---|---|---|---|
| 4,633,246 A | 12/1986 | Jones et al. | 340/825.05 |
| 4,703,325 A | 10/1987 | Chamberlin et al. | 340/825.17 |
| 4,748,654 A | 5/1988 | Gray | 379/40 |
| 4,791,658 A | 12/1988 | Simon et al. | 379/41 |
| 4,823,345 A | 4/1989 | Daniel et al. | 371/37 |
| 4,856,047 A | 8/1989 | Saunders | 379/57 |
| 4,893,307 A | 1/1990 | McKay et al. | 370/94.1 |
| 4,951,029 A | 8/1990 | Severson | 340/506 |
| 4,964,065 A | 10/1990 | Hicks et al. | 364/514 |
| 4,965,772 A | 10/1990 | Daniel et al. | 395/275 |
| 4,996,703 A | 2/1991 | Gray | 379/40 |
| 5,049,873 A | 9/1991 | Robins et al. | 340/825.06 |
| 5,063,523 A | 11/1991 | Vrenjak | 364/514 |
| 5,119,377 A | 6/1992 | Cobb et al. | 371/19 |
| 5,136,594 A | 8/1992 | Sharp | 371/49.1 |
| 5,155,842 A | 10/1992 | Rubin | 395/575 |
| 5,163,151 A | 11/1992 | Bronikowski et al. | 364/1 |
| 5,210,866 A | 5/1993 | Pfeffer et al. | 395/575 |
| 5,251,302 A | 10/1993 | Weklet et al. | 395/250 |
| 5,764,886 A * | 6/1998 | Danielson et al. | 714/47 |

* cited by examiner

IN-BAND/OUT-OF-BAND ALERT DELIVERY SYSTEM

CROSS REFERENCE TO RELATED APPLICATIONS

This application is a con't of Ser. No. 08/562,780 filed Nov. 27, 1995 U.S. Pat. No. 5,764,886, which is a con't of Ser. No. 08/250,651 filed May 27, 1997 abandoned which is a con't of Ser. No. 07/720,258 filed Jun. 24, 1991 abandoned.

This application is related to co-pending U.S. patent application Ser. No. 07/720,259 entitled COMPUTER SYSTEM MANAGER, Ser. No. 07/719,240 entitled INNATE BUS MONITOR FOR COMPUTER SYSTEM MANAGER, Ser. No. 07/719,243 entitled REMOTE CONSOLE EMULATOR FOR COMPUTER SYSTEM MANAGER, Ser. No. 07/719,394 entitled POWER SUPPLY FOR COMPUTER SYSTEM MANAGER, all of which were filed on even date herewith, assigned to the assignee of the present invention and hereby incorporated by reference as if reproduced in their entirety.

BACKGROUND OF THE INVENTION

1. Field of the Invention

The present invention relates to hardware manageability support systems in network environments. More particularly, the present invention relates to systems that deliver alerts in local area network, wide area network, enterprise network environments, and the like.

2. Description of Related Art

In its simplest form, data communication takes place between two devices that are directly connected by some form of point-to-point transmission medium. However, in certain instances it is impractical for two devices or components to be directly, point-to-point connected. An example of such an instance is when there are a set of devices, each of which way require a link to many of the others at various times. This problem has been heretofore addressed by attaching multiple devices to a communication network. Each device, or station, is attached to a network node. The set of nodes to which stations attach is the boundary of a communication network that is capable of transferring data between pairs of stations.

Communication networks may be categorized based on the architecture and the techniques used to transfer data. Two major different types of communication networks are switched networks and broadcast networks. Switched networks involve transfer of data from a source to a destination through a series of intermediate nodes that provide a switching facility to move the data from node to node. Examples of switched communication networks include circuit switched networks, message switched networks, and packet switched networks. Broadcast networks involve no intermediate switching nodes; each station has a transmitter/receiver that allows communication over a common medium, so that a transmission from any one station is broadcast to and received by all other stations in the network. Examples of broadcast communication networks include packet radio networks, satellite networks, and local networks.

The present invention is especially designed to operate in packet-broadcasting networks such as local area networks ("LANS"), wide area networks ("WANS"), enterprise network environments ("enterprise environments") and the like. As those skilled in the art should appreciate, the terms LANs, WANs and enterprise environments have constantly evolving meanings. In general, however, a LAN is a general-purpose local network supporting personal computers ("PCs"), a WAN is a general-purpose network supporting a wide area relative to a LAN (usually because it passes through a public switched telephone network at least in part), and an enterprise environment is a general-purpose network supporting mini computers and mainframes. LANs, WANs, and enterprise environments can also support any number of other peripherals (e.g., printers), and quite often carry voice, video, and graphics as well as data. To assist those presently familiar with and skilled in the art in understanding what is meant by the various network terms used herein, the term LAN as used herein encompasses Novell NetWare, SCO UNIX, Banyan VINES, Microsoft LAN Manager, and the like. Further, the term enterprise environment as used herein encompasses IBM SNA Management Services, DEC Enterprise Management Architecture, AT&T Unified Network Management Architecture, SNMP-Based Management Stations, Hewlett-Packard's OPENVIEW, and the like.

As will become apparent from the detailed description of the invention section below, the present invention may be viewed as an alert delivery system servicing a number of system components that supplement conventional network components to enhance management functions. These conventional network components include network management agents and network manager consoles. Underlying both of these components is a network operating system ("OS"). The OS is software, firmware, or hardware that controls the execution of processes in a system. Services provided by an OS can include resource allocation scheduling, input/out control, and data management. The theory behind an OS is to provide support in a single spot so that each program does not need to be concerned with controlling hardware. A network management agent is a part of the OS. The network management agent is the central collection point for a particular server's network management information. Typically, the information is stored in an object oriented format for use by "network manager" software that runs on the network such as a remote console or IBM's Netview. A network manager console, the second component mentioned above, is generally provided as an optional component piece of an OS network management package. Typically, the network manager console allows one central point of monitoring and control for a network administrator's domain of interest. From the console the administrator can view and control the object registered with the network management agent. The network manager console represents one type of manager software connected over the internet (i.e., interconnected networks) with the network management agent. Other network manager software can also make use of the information in the management agent.

Two other concepts that should be fully understood to appreciate the present invention are "in-band" and "out-of-band". The term in-band is used herein to refer to signals sent via network management software residing locally on the server. In simple terms, in-band refers to use of the wire that comes with a network. The term out-of-band refers to communications that leave the computer system manager (discussed length in the related case so titled) via an asynchronous port. Although the out-of-band concept will be discussed in much greater detail below, it should be appreciated that asynchronous transmission is involved, that is, transmission in which each information character is individually synchronized, usually by the use of start elements and stop elements.

Although network managers have heretofore been able to provide an acceptable level of network management, the constant improvements being made in networks betray the fact that many improvements can still yet be made. For example, it is important that the system software or the network manager be notified about significant or potentially significant events occurring or about to occur in the network. Alerts perform such a function. However, prior art alert delivery systems have a number of shortcomings and defects. For example, prior art alert delivery systems are limited as to the number and types of alert receivers, the alert transmission media that can be used, capability for retrying, and effectiveness of the underlying algorithm, to name just a few.

SUMMARY OF THE INVENTION

The present invention overcomes the shortcomings and deficiencies of the prior art by providing an in-band/out-of-band alert delivery system for a computer system manager including an alert log which maintains a record of alerts to be delivered and the status of those alerts, an alert manager for making a first attempt to deliver each alert, and a retry manager for making subsequent attempts to deliver alerts as becomes necessary and appropriate.

In embodiments of the alert delivery system of the present invention there may be a bus master interface manager for making in-band alert deliveries and a communications manager for making out-of-band alert deliveries. Telephone numbers may be provided to the communications manager by an alert destination list. Out-of-band alert deliveries may be made via a modem, a universal asynchronous receiver transmitter, or the like.

According to the teachings of the present invention, out-of-band deliveries may be made to pagers, telephones and remote consoles via asynchronous lines. The underlying algorithm in embodiments of the present invention is designed for maximum success rate, via exhaustive retrying, in delivering alerts.

Accordingly, it is an object of the present invention to provide an improved alert delivery system for incorporation into data communication network environments.

Another object of the present invention is to provide an in-band/out-of-band alert delivery system with a persistent retrying capability.

Yet another object of the present invention is to provide an in-band/out-of-band alert delivery system for a computer system manager that is able to deliver alerts to many different types of alert receivers including pagers, telephones and remote consoles.

Still yet another object of the present invention is to provide an in-band/out-of-band alert delivery system for a computer system manager which operates based upon a very effective "underlying" algorithm.

BRIEF DESCRIPTION OF THE DRAWINGS

Other objects, advantages, and novel features of the present invention will become apparent from the following detailed description of the invention when considered in conjunction with the accompanying drawings wherein.

DETAILED DESCRIPTION OF THE INVENTION

Figure 1:
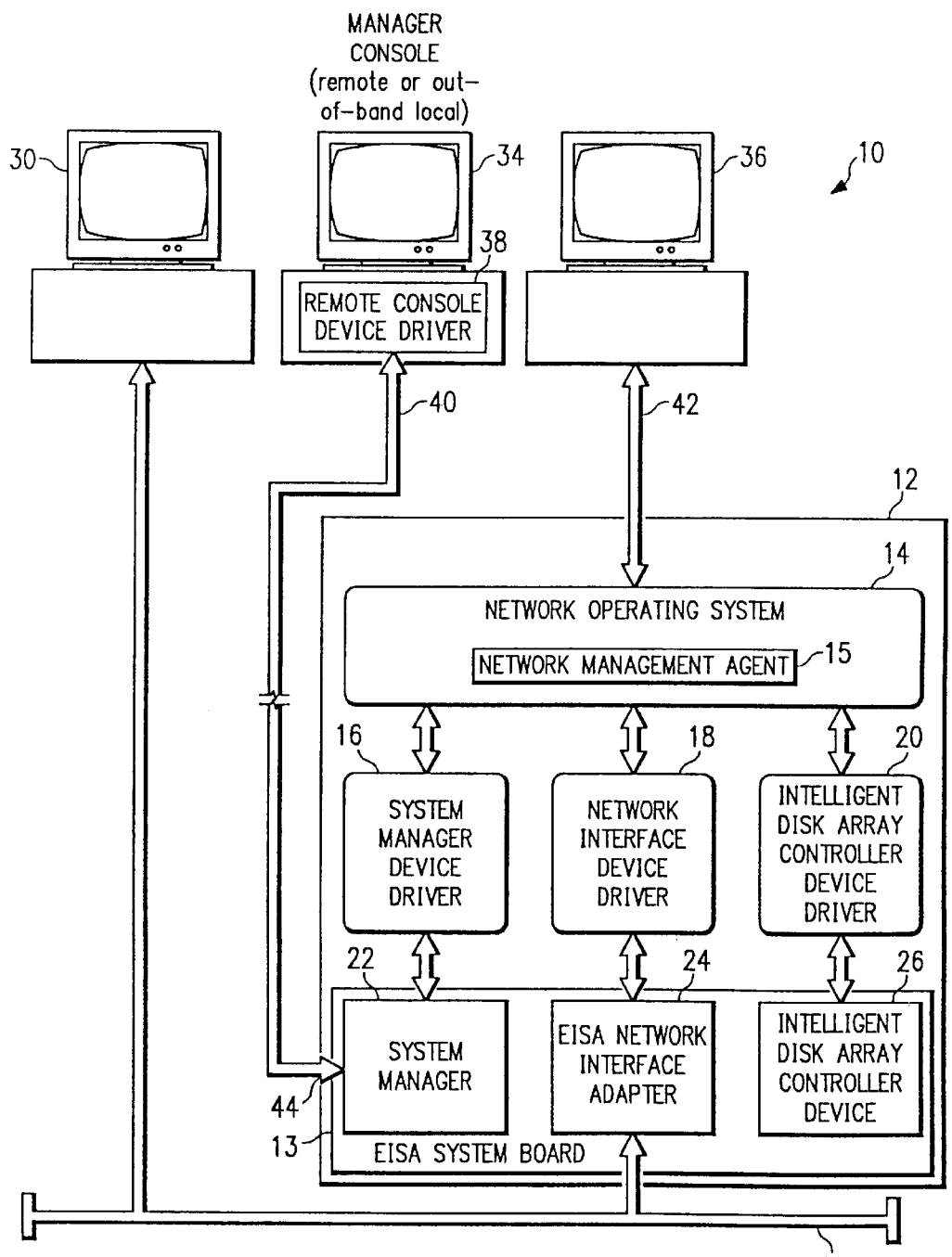
FIG. 1 is a block diagram of a computer network having an EISA based computer system and a system manager board installed therein.

As discussed in detail in other of the related cases referenced above, the management system in which the alert delivery system discussed herein may be incorporated is in one embodiment a system of hardware and software components that provide enhanced hardware management capabilities for EISA-based systems. In this embodiment, the management system is designed to be incorporated into LANS, WANS, enterprise environments, and the like.

In greater detail, and as also discussed in greater detail in other of the related cases referenced above, in various embodiments the system of hardware and software components can include a 32-Bit intelligent Bus Master EISA board and firmware, an OS device driver, a remote asynchronous driver, a remote asynchronous console program, and configuration support. These components are coupled with a network management agent and a network manager console, both of which are discussed in the description of related art section above, so as to provide enhanced hardware management capabilities. Because these various components are discussed in detail in other of the related cases referenced above, they will not be discussed in detail herein. However, it may be noted that the 32-Bit intelligent Bus Master EISA board and firmware provides the hardware and firmware support for alerting controlling and monitoring functions, which functions are discussed further below as well as in the related cases. The OS device driver, a component which is necessary for each supported operating system, is a mechanism for providing two-way communication between a network management agent running on the operating system and the system manager hardware. The remote asynchronous driver is a mechanism for enabling access to the 32-Bit intelligent Bus Master EISA board mentioned above through an asynchronous connection. Further, the remote asynchronous driver enables remote console software operation as discussed in other of the related cases referenced above. The remote asynchronous console program is a software component that executes on any PC connected to a modem or asynchronous interface of the system manager. This software interacts with the 32-Bit intelligent Bus Master EISA board by calling a resident asynchronous driver API that has a protocol link with an asynchronous or modem port of the system manager. The API allows remote control (e.g., rebooting), access to stored data, and a remote console function. The remote console emulation (text mode only) is independent of the system and OS allowing significant functionality without the support of the network or operating system. Remote console emulation is the express subject matter of related U.S. patent application Ser. No. 07/719,243 incorporated herein. All out-of-band accesses to the modem or asynchronous interface of the system manager can be made to require security checks before access is allowed. The final component of the management system listed above, configuration support, involves configuring the 32-Bit intelligent Bus Master EISA board into an EISA system using an EISA configuration utility with corresponding and appropriate files. Default settings for the cards' configurable options can be stored in the host EISA nonvolatile memory. The management system may also require runtime configuration, possibly remotely, to set thresholds for alerting temperatures and other specific configuration options discussed further below. These configuration commands can be made available at various points throughout the management system.

The system manager described in the immediately preceding paragraph can perform a number of functions. Four of the many functions it can perform are alerting, monitoring, remote management, and histories. Although alerting will be discussed in great detail below, it may be noted at this point that the management system discussed in general in the various related applications is able to dial a preconfigured telephone number and report important events, that is, to alert. Alerting can be accomplished by any of the following methods: by sending a protocol message over a switch telephone connection or through a direct serial connection, by dialing a phone number associated with a pager, and/or by dialing a phone number associated with a person and leaving a synthesized voice message. The foregoing list is not exhaustive as will be discussed further below.

The second function mentioned above, monitoring, is the ability of the system to monitor system components and parameters. Simply, this means that if a component experiences a failure, or exhibits characteristics that indicate that it might have a failure, portions of the management system can detect this and report it to a system software entity that can, in turn, report the information to a network administrator so that corrective action can be taken. Three examples of a multitude of system components and parameters that can be monitored by the management system include system power, internal temperature, and memory refresh and parity. In all three of these examples alerts or portions of the alerting system may be involved. For example, if the system detects a drop in system power (i.e., below some predefined threshold), it may report the event as an alert. Likewise, if the temperature rises above a predetermined threshold, the system may issue an alert. Still further, if the system detects the absence of memory refresh signals or a memory parity error, it may issue an alert. In general, associated with the various system objects within the system may be a capability to provide generic thresholding and alerting. That is, if some counter or value within a system object exceeds a threshold, the system can automatically send an alert either locally or through one or both of its serial ports.

The remote management function refers to the ability to provide remote management of a server. As previously discussed, alerting is a function that may be provided remotely. Additionally, the management system can, in some embodiments, recognize a small list of tones over its modem connection. These tones may be used to issue commands. For example, when the management system issues an alert over a modem using voice synthesis, a touchtone command may be used to "acknowledge" the alert.

Based upon the foregoing, it should be readily apparent to those skilled in the art that the management system discussed in this and the various related cases has an alert delivery system, which alert delivery system is not only important independently, but which system is also important because its capabilities and operations management permeate and influence various other components throughout the system. With that in mind, the alert system may now be discussed in detail.

Referring initially to FIG. 1, an extended industry standard architecture ("EISA") based computer network 10 is shown therein. The computer network 10 includes an EISA server 12 and an EISA board/bus 13. Installed on the EISA system board 13 are a plurality of cards including a system manager 22, an EISA network interface adapter 24, and an intelligent disk array controller device 26. Also running on the EISA server 12 is a network operating system 14, preferably one which includes a network management agent 15. Two-way communication between the system manager 22 and the network management agent 15 is provided by a system manager device driver 16. In a similar manner, a network interface device driver 18 interconnects the network management agent 14 and the EISA network interface adapter 24, and an intelligent disk array controller device driver 20 interconnects the network operating system 14 and the intelligent disk array controller device 26. Also shown in FIG. 1 are three terminals connected to the overall network 10. Terminal 30 is con ed to the EISA network interface adapter 24 via EISA bus 28. Terminal or network manager console 34 is connected to the system manager 22 via an asynchronous (out-of-band) line 40. Finally, terminal or network manager console 36 is connected to the network operating system 14 via inter-network communication (in-band) line 42. The network manager console 34 may operate in either a remote or an out-of-band local mode. The network manager console 36 operates only in a local mode.

Alerts are used to notify system software or a network administrator about important events. For example, if the host experiences a power failure, the enhancement or EISA system board 13 detects the loss of power and sends an alert. As heretofore mentioned, there are two types of alerting: in-band or out-of-band. In-band alerts are sent to software residing locally on the server 12 with the enhancement board 13. If an alert is to be delivered in and out-of-band, one or the other (typically the in-band alert) may be delivered first. Out-of-band alerts are sent through the EISA system board's asynchronous port (designated by reference numeral 44 in FIG. 1) to a remote application. These alerts include alerts sent to a remote console, a phone, or a pager.

Figure 2:
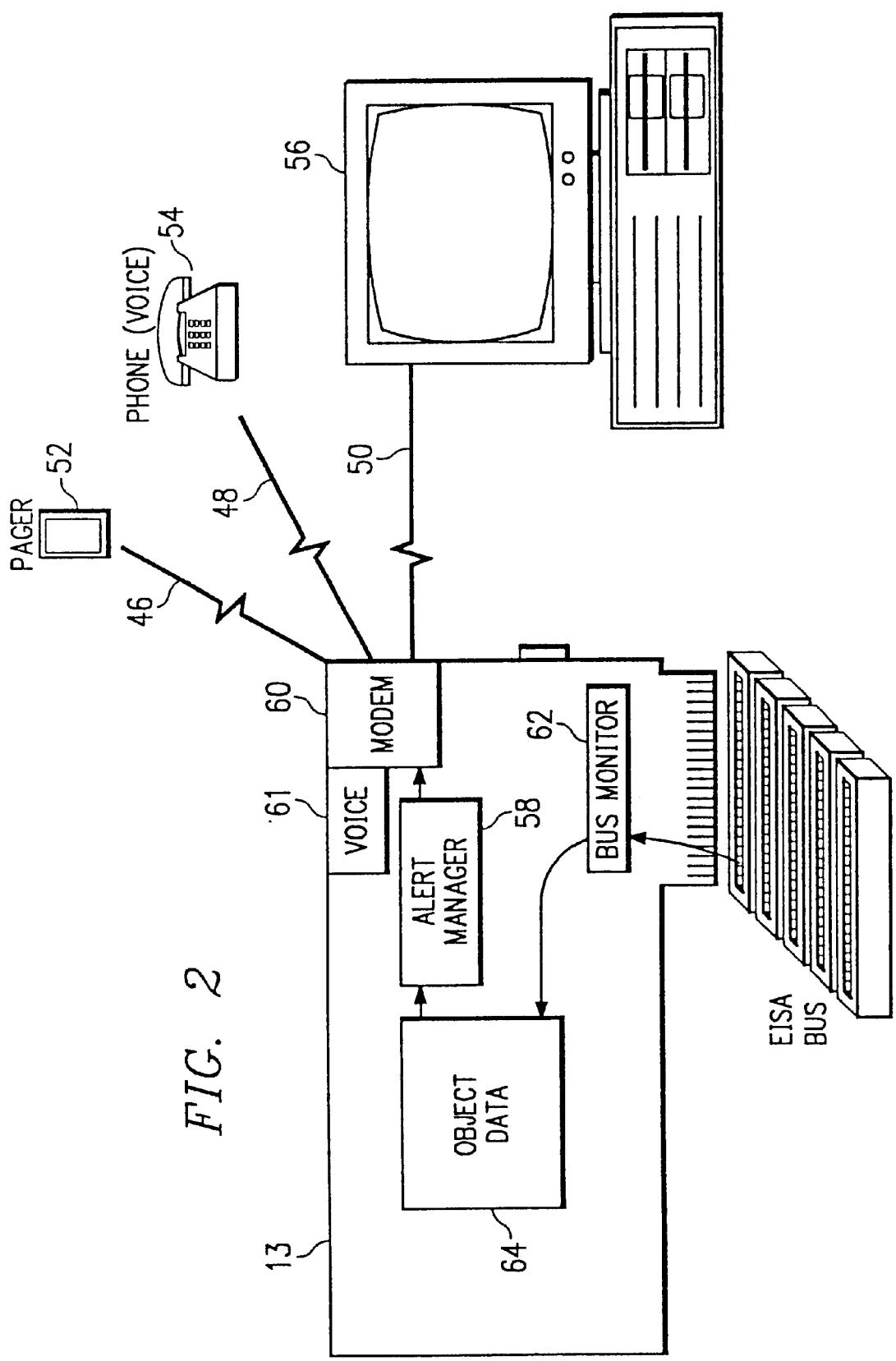
FIG. 2 is a block diagram of portions of the EISA system board of FIG. 1 which illustrates information flow to and from, as well as within, the board.

Referring now to FIG. 2, further details regarding the alert system are set forth therein. In that FIG. it may be seen that asynchronous lines 46, 48, 50 may exist between the EISA system board 13 and a pager 52, a telephone 54 and a console 56, respectively. Although further details will be provided below, it may be noted in FIG. 2 that from a functional point of view, the EISA system board 13 includes an alert management controller or alert manager 58 which can trigger operation of a modem 60 with voice capability 62 as appropriate based upon comparison of values obtained from a bus monitor 62 and threshold values in an object data file 64.

Figure 3:
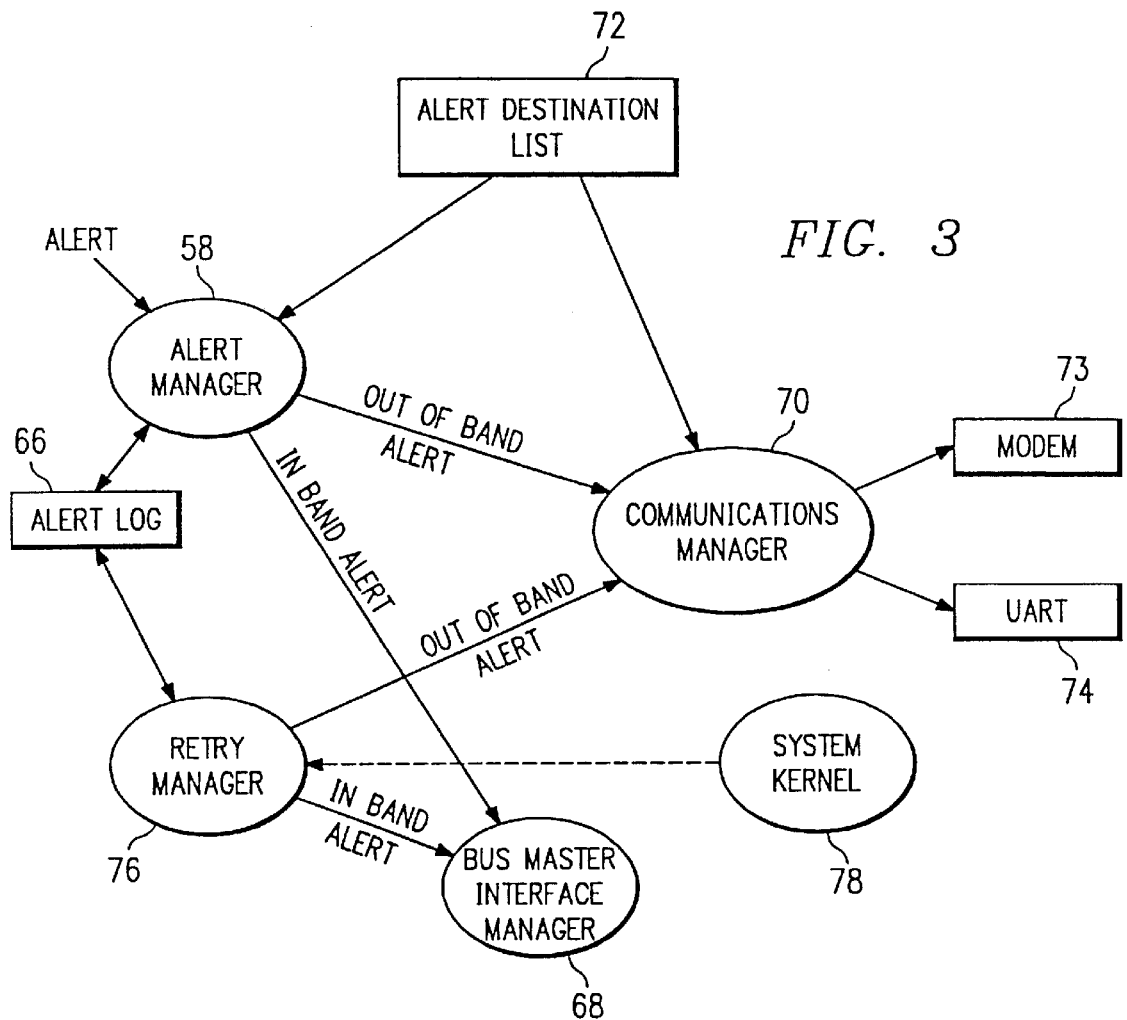
FIG. 3 is a flow diagram illustrating decisional processes in an embodiment of the alert delivery system according to the teachings of the present invention.

Referring now to FIG. 3, there is shown a flow diagram illustrating decisional processes in embodiments of the alert delivery system according to the teachings of the present invention. Operation of the alert delivery system according to the teachings of the present invention begins with generation of an alert and delivery of that alert to the alert manager (discussed above with respect to FIG. 2 ). Promptly upon receiving a new alert, the alert manager 58 has the fact that the alert was received entered into an alert log 66. The alert manager 58 then makes a first effort to deliver the alert, either in-band via a bus master interface master 68 (a card between software layers and hardware in the management system) or out-of-band via a communications manager 70. The communications manager 70 may, and likely would be, a piece of code in board 13. Telephone numbers are required to deliver out-of-band alerts; thus, an alert destination list 72, comprising such numbers, is associated with the alert manager 58 and the communications manager 70 to transmit as and when appropriate, telephone numbers for out-of-band alerts. The communications manager 70 may direct the operation of other components to deliver out-of-band alerts. Such components may be a modem 72 and/or a universal asynchronous receiver transmitter ("UART") 74 as shown in FIG. 3.

A very important aspect of the present invention is also shown in FIG. 3. this aspect is a retry capability. Quite often alerts are not satisfactorily delivered the first time they are sent. For example, no one may be sitting at a particular terminal where an alert is delivered or no one may answer a telephone call via which an out-of-band alert delivery is being attempted. The present invention overcomes this problem by including a retry manager 76. The retry manager 76, like the alert manager 58, has access to the alert log 66 so that it can both note that an alert needs to be delivered and update the alert log status when an alert is properly delivered. Assuming that the alert manager 58 fails in its attempt to deliver an alert, the retry manager 76 can detect that fact via the alert log 66 and itself attempt to deliver the alert, whether in-band or out-of-band. Retry manager timing is provided by a system kernel 78. In the retry manager can continue attempting to deliver an alert at predetermined intervals until the alert is delivered. Once the alert is delivered, entry of that fact in the alert log 66 can terminate the delivery processes.

Before discussing the alert delivery system of the present invention in detailed functional terms, a few comments about alert generation may be helpful and, thus, follow. The various system components being monitored by a system manager may be grouped into classes. Each system component within a given class may be referred to as an object. All objects consist of attributes that describe the status of the object. In such a case there may be three types of attributes that can cause alerts: a counter, a state, and a threshold.

Alerts may be caused when current values exceed boundaries that have been set. The current values change when the attributes are, e.g., incremented, decremented, updated, reset, or modified. When a current value comes back into boundaries set for it and then travels outside those boundaries again, another alert may be generated. In addition to the above operations, an alert may be caused if the attribute is created with alert conditions already present. The following table is an example of a threshold attribute.

An example of an alert structure command is as follows:

Command (40h) (byte)
Object ID (4 bytes)
Instance (byte)
Attribute ID (byte)
Attribute type (2 bytes)
Voice Error message # (byte)
Object label (16 bytes)
Attribute label (16 bytes)
Class (4 bytes)
Date (3 bytes)
Time (3 bytes)
Current Value (4 bytes)
Limit Value (4 bytes)
Optional Value (4 bytes)

To assist those skilled in the art in fully understanding the present invention, and to provide an example embodiment of the present invention with a number of unique aspects and advantages, affects of other commands in an embodiment of the present invention will now be discussed.

In one embodiment of the present invention, alerts are stored in the alert log 66 along with their status. The status of these alerts is affected by three commands: Get Alert Log, Load Configuration, and Feature Control.

When Get Alert Log is issued from the host, it affects the status of in-band alerts. The alert log 66 affects out-of-band status when the command is issued from a remote application. When the Get Alert Log is issued all the alerts for that band are considered delivered since all the information given in response to Get Alert Log is the same information delivered for a single alert delivery.

The intent of the Get Alert Log command is to provide the user a way to terminate alert delivery while retaining an alert history that is provided in the alert log 66; by marking the alerts Done after viewing alerts in the log, this goal is achieved.

Threshold Example

| | |
|---|---|
| 24 | (byte - Attribute ID) |
| 1(Enable)  0(In)  1(Out)  1(res)  1(internal)  0(Res)  0(Res)  0(host notify) | |
| 1(meaning)  1(meaning)  1(meaning)  1(sev)  1(sev)  0(type)  1(type)  0(type) | |
| 6 | (byte - voice error message) |
| "System voltage" | (16 byte label) |
| 0 | (2 bytes next offset) |
| 4750 | (4 byte low threshold) |
| 5250 | (4 byte high threshold) |
| 5000 | (4 byte default value) |
| 5500 | (4 byte current value) |
| 052091 | (3 byte date: Month/Day/Year) |
| 123033 | (3 byte time) |

The meaning bits specify if an alert will occur when the current value is equal to, or within the thresholds. In the example, the voltage thresholds are 4750 mv and 5250 mv. The meaning bits (111) specify that an alert should be signaled when the voltage is outside of the threshold values. The example is set for an out-of-band alert, with, as will be discussed further below, attribute logging and host notification on.

If the Load Configuration command contains a new alert destination list, all current destination member references in the alert log 66 become invalid. Out-of-band members are referenced by index only and because the indexed destination member in the new list has no correlation to the member in the old list, the board 13 must invalidate the, alert entry. Note: The alert itself is still retained, but its delivery status becomes invalid.-

Alerting can be disabled by the Feature Control command. If disabled, all current alert log entries will be marked Invalid for both bands. New alerts will be discarded until alerting is re-enabled.

Continuing to discuss a particular embodiment of an alert delivery system according to the teachings of the present invention, the alert log 66 itself has two main sections for each alert; an alert delivery status section and a destination member status section.

The following table illustrates the parts of each alert log entry.

Alert Log

| Alert #1 | Alert Delivery Status Byte | |
|---|---|---|
| | In-band | Out-of-band |
| Destination Member Status-0 through 15 | | |
| (Bits 7–3) Number of retries left for member (0) | status2 (Bit 2) | status1 (Bit 1) | status0 (Bit 0) |
| : | : | : | |
| : | : | : | |
| (Bits 7–3) Number of retries left for member (15) | status2 (Bit 2) | status1 (Bit 1) | status0 (Bit 0) |

The alert delivery status section describes the alert status for the entire alert, i.e. whether the alert has completed the process through the entire destination member list. The alert may be:

Pending (i.e., queued, but not sent. Status=2.)
Done (successfully delivered in-band; retry count has been met or successful delivery for all out-of-band members. Status=5.)
Failed (could not be delivered. Status=4.)
Invalid (will not be delivered ever. Status=0Ah.)
Not done (either retry is processing, or not all alert destination members have received this alert. Status=4 or 7.)

With respect to the destination member status section, at configuration, an alert destination list is defined which contains the phone numbers and all pertinent information needed to send an alert. Each member that should receive the alert has a status in the alert log destination member status. If a remote calls in that is not in the destination list, no alerts will be delivered to that remote.

Describing the embodiment of the present invention being discussed functionally, when the Get Alert Log command is issued from the host (i.e., via terminal 36 in FIG. 1), the alert log will appear as it is at that time. Right after viewing, several changes occur within the log, and the status of alerts change. These changes occur only on those alert entries that are viewed. The changes will show when the Get Alert Log command is issued again.

1. Once the alert type Failed, (Status=4) has been viewed it will be marked Success (Status=5) because that entry in the alert log has been viewed, it is considered delivered. This holds true for in-band alerts only.

2. When the Get Alert Log is issued, the following in-band alerts will not change:
  pending (no attempt has been made to deliver yet. Status=2.)
  processing (in the process of being delivered. Status=3.) or
  invalid (will not be delivered. Status=0Ah.)

The following effects are valid at the time the Get Alert Log command is issued.

1. The alert log will not contain entries for alerts that were in the process of being added to the alert log. For instance, if the alert log had previously stabilized at 32 entries, and the command is issued while a new alert entry is being built, only 31 will be returned. One will be displaced (note that only 32 entries are allowed in this embodiment of the present invention) and the new one is not yet valid.

2. If the buffer size is not big enough to contain all the alerts, only the number of entries that fit will be returned. An error code (13h) "not enough buffer size" will be returned.

3. If the user requests more log entries than currently exist in the alert log, only those in the log will be returned. If the user requests more than 32 entries, an "invalid log number" (18h) error code will be returned.

If the user requests more than 32 entries and the buffer size is not big enough to contain all alerts, the buffer size error overrides the "invalid log number error". Only the "host buffer size not large enough" error 13h will be returned.

4. If more alerts have been generated than the alert buffer can hold, new alerts will be discarded and a log overrun (01h) will show on the Error code when the Get Alert Log command is issued. The log overrun will be cleared after each Get Alert Log.

The alert log is a circular buffer. A maximum of 32 entries, as previously mentioned, are allowed in the buffer. New alerts will overwrite any old alerts that are:
  Not Done (Status=4)
  Done, or Success (Status=5)
  Invalid (Status=0A) An overrun error will occur if the old alerts are:
  reserved (Status=1)
  pending (Status=2)
  processing (Status=3)

Continuing to describe the embodiment of the present invention being discussed functionally, when the Get Alert Log command is issued from the remote (i.e., via terminal 34 in FIG. 1), the alert log will appear as it is at that time. Right after viewing, several changes occur within the log, and the status of out-of-band alerts change. These changes occur only on those alert entries that are viewed. The changes will show when the Get Alert Log command is issued again.

1. The alert type Not Done (Status=4, and 7) will be marked Done (Status=5) because those Alerts in the Log that have been viewed, are considered delivered.

2. When the Get Alert Log is issued, the following alert status will not change:
  pending (no attempt has been made to deliver yet, Status=2)
  processing (in the process of being delivered, Status=3), or
  invalid (will not be delivered, Status=0A)

3. If the Get Alert command is issued with the number of entries equal to zero, alert entries status=4 and 7 will be marked Done on all the entries in the log even though none were actually viewed.

The following effects are valid at the time the Get Alert Log is issued.

1. The alert log will not contain entries for alerts that were in the process of being added to the alert log. For instance, if the alert log had previously stabilized at 32 entries, and the command is issued while a new one is being built, only 31 will be returned. One will be displaced (only 32 entries are allowed) and the new one is not yet valid.

2. If the user requests more log entries than currently exist in the alert log, only those in the log will be returned. If the user requests more than 32 entries, an invalid log number (18h) error code will be returned.

3. If more alerts have been generated than the alert buffer can hold, new alerts will be discarded and a log overrun (01h) will show on the Extended Error code when the Get Alert Log command is issued. The log overrun will be cleared after each Get Alert Log.

Regarding load configuration, if the board 13 has not been configured, alerts cannot be sent or received. If Load Configuration (for reconfiguration) is issued while the alert log has any valid entries and a new alert destination list is assigned:

1. All out-of-band alerts that have been delivered to at least one alert destination in the old list will be marked Invalid in the Alert Delivery Status. These alerts will not be delivered to any other destinations.

2. If none of the alert destinations members have received the alert or an alert status is processing:

A. The Destination Member Status will be zeroed out, and the retry count filed will be updated according to the new configuration.

B. The Alert Delivery Status will be marked Not Done (Not Done; Status=4).

C. The retry process will attempt delivery to the members of the new Alert Destination list.

The user may receive an alert twice if an alert was in process and reached a destination. The retry task will send this alert again according to the new Alert Destination list.

Duplicate alert destination members will be treated separately; the user will receive one alert for each time that member appears in the list.

The command Feature Control allows the user to disable alerting by setting bit 2 of the Feature Control Flag to 1. The alert log will change in the following manner:

1. All new alerts will be discarded.

2. All out-of-band Alert Delivery Status will be marked Invalid (status=0Ah) and will not be delivered. The Destination Member Status will still show which members have received the alert.

3. In-band alerts will be marked Invalid (Status=0Ah).

If the asynchronous interface has been disabled (bit 2 of Feature Control Flag set to 1):

1. All new alerts will be entered into the alert log.

2. The out-of-band Alert Delivery Status (pending-Status=2, and processing-Status=3) will be marked Not Done (Status=4). These alerts will be delivered later.

3. The retry count will not decrement until the asynchronous interface is re-enabled and alerting resumes.

Discussing now the retry portions of the embodiment of the present invention being described in detail, the retry count, plus one, is the number of times the board 13 will try to deliver the alert. If the retry count is zero, the board will still try to delivery the alert at least once.

Whenever the board fails to deliver the alert message the retry count will decrement, the board will disconnect the session and try another destination member. For a failed alert, the retry interval will be 6 minutes. A failed alert may occur because a connection could not be established (will try the next destination member on list) or because the remote returned a value other than success (will try the first destination member in the list).

Once there is a valid connection with any destination member, whether initiated by the board or by a remote, those alerts that have been marked as Failed will be delivered. Those marked as Not to be Delivered (not the right time and date) will also be delivered because the date and time mask only restrict the board from attempting a call, not from delivering alerts. If either of these cases fails to successfully complete the delivery of an alert (proper response is not received by the board), the board will disconnect.

If a remote calls in that is not in the Destination Member list, no alert will be sent to that remote.

Set forth immediately below are a number of examples of structure and operation of the embodiment of the present invention being discussed in detail herein.

EXAMPLE 1

If the user configures the system to have 5 alert destination members, the board will try to establish the connection in order (starting from member 0). Assume the retry count is set to zero (only one try will be made per destination) and there is no date and tire mask specified. If the board fails to establish a connection with destination members 0–2 and succeeds to establish the connection with and send the alert to member 3, the alert log will be marked as follows:

| Alert Delivery Status = Not Done; Status 4 | |
|---|---|
| Alert Destination | Destination Member Status |
| member 0–2 | Failed |
| member 3 | Success |
| member 4 | To be delivered, (has not been tried yet-retry count = 0) |

The board could not deliver the alert to 0–2 and moved on to 3. These alerts will not be tried again because the retry count was zero, but will be delivered if a connection is made to these members at a later time. The board has not tried to establish a connection with member 4, so the retry count is zero, and the alert will be tried once. The Alert Delivery Status is Not Done (Status=4) because not all the members have been tried.

EXAMPLE 2

Using the same example, but a retry count of 5 for each destination member and no time and date mask:

| Alert Deliver Status-Not Done; Status = 4 | |
|---|---|
| Alert Destination | Destination Member Status |
| member 0–2 | To be delivered-retry count = 4 |
| member 3 | connection-disconnect. |
| member 4 | To be delivered retry count = 5 |

For members 0–2, the alert has not been delivered, but one try has been made to each. Five more tries will be made to these members. (It should be recalled that a try will be made when the retry count equals zero.)

Member 3 received some other value besides success and was disconnected. The next alert to be tried will be member 0.

Member 4 has not been tried yet.

EXAMPLE 3

Using the same example, with a retry count of 5 for each destination member and no time and date mask this example shows the status before any attempts have been made:

| Alert Delivery Status-Not Done; Status = 2 | |
| --- | --- |
| Alert Destination | Destination Member Status |
| member 0–4 | Retry = 5; no attempt has been made on any destination. |

EXAMPLE 4

Using the same example, with a retry count of 5 for each destination member and no time and date mask this example shows the status as the first attempt is in progress:

| Alert Delivery Status-Not Done; Status = 3; processing | |
| --- | --- |
| Alert Destination | Destination Member Status |
| member 0 | To be delivered (status 100); Retry = 5; |

EXAMPLE 5

In this example, the retry count is 5 for each destination member, and the date and time mask has been set to deliver alerts on Monday 8:00 a.m.–5:00 p.m. only. The current time is Monday 8:00 a.m.

| Alert Delivery Status-Not Done; Status = 7 | | |
| --- | --- | --- |
| Alert Destination | Destination Member Status | Time Mask |
| member 0 | Will not be delivered in current time frame. (status 011) | Friday 8:00 a.m.–5:00 p.m. |
| member 1 | Success (status 001) | Monday 8:00 a.m.–5:00 p.m. |
| member 2 | To be delivered (status 100); Retry = 5; | Monday 8:00 a.m.–5:00 p.m. |

Member 2 is curtly being processed, thus the overall Alert Delivery Status is Nat Done (Status=7).

EXAMPLE 6

In this example, the retry count is 5, and the date and time mask has been set to deliver alerts on Monday 8:00 a.m. to 5:00 p.m. only. The current time is Monday 8:00 a.m. The entire list has been tried at least once.

A session has been established by remote destination member 0, thus the alerts marked as Will Nat Be Delivered In Current Time Frame will be delivered. If this same alert had been marked Failed, (retry count was met, no more tries will be made) the alert would be delivered (Failed→Success).

| Alert Delivery Status-Not Done; Status = 4 | | |
| --- | --- | --- |
| Alert Destination | Destination Member Status | Time Mask |
| member 0 | Will not be delivered in current time frame.->Success. | Friday 8:00 a.m.–5:00 p.m. |
| member 1 | Success (status 001) | Monday 8:00 a.m.–5:00 p.m. |

In the embodiment of the present invention being discussed in detail herein, connect flags determine which alert destination members should receive an alert.

The retry count is indicated in the connect flag bits 0–4. Thus for each destination member it is possible to have a different retry count. For example, if member 0 has the connect flag set to four, that member will have a retry count of four (5 tries will be made). Member 1 could have the connect flag set to 5, meaning the retry count is five. Zero means do not retry the alert, but the alert will be tried once.

Bit 5 and 6 of the connect flags have the following meanings when there is an alert to be delivered:

| Bit 6,5 | Meaning |
| --- | --- |
| 00 | Blank Entry. None of the alerts will be delivered to this destination. |
| 01 | Alert. The board will establish the connection and deliver the alert to this destination member. Call back feature is disabled. |
| 10 | Call Back. The board will not initiate the connection. If a connection exists the board will deliver the alert. Call back is enabled for this destination member. |
| 11 | Alert and call back. The board will establish the connection and deliver the alert to this destination member. Call back feature and alert feature are enabled. |

With respect to voice alert procedure in the embodiment of the present invention being discussed in detail herein, communication between the enhancement board voice circuit and the user is through a touch tone telephone. Upon receiving a voice message from the Enhancement board, the user needs to communicate with the board by pressing the appropriate touch tone button.

Listed below are the steps for communicating with the board in the embodiment of the present invention being discussed:

1. As soon as dialing has been completed by the board, the voice message will state one or more identification numbers. The board cannot detect when the phone has been answered due to hardware limitations. Thus the message will begin as the phone is ringing. In order to allow the user to hear a complete message, the message will repeat three times. When the user first answers the phone, the message may be in progress.

2. Next, the board will request a password. After the password is entered the user may press # to indicate he has completed the password.

Please enter password then press pound sign to continue.

If the user does not enter the password within 5 seconds, the message will be repeated 3 more times before the board hangs up the phone. If the user enters the wrong password and realizes his error before pressing the pound sign (#), he may simply type an asterisk (*), and then retype the correct password followed by the pound sign (#).

The user has 3 tries to enter a correct password. After 3 failures, the board will hang up.

The board will wait up to 5 seconds for each password digit. If the user fails to enter the next password digit within the limited time, the board will terminate the session and hang up the phone.

3. After entering a correct password, the voice gives the alert message. For example the voice may state:

Alert message number 255. 10:30 a.m. January 5.

4. Next the voice will give instructions for repeating, continuing or ending the session:

Press 1 to repeat, press 2 to continue, press 3 to end session

The user has 5 seconds to respond before the message repeats up to a maximum of 3 times. If the user does not respond, the board will terminate the session and hang up the phone. Pressing 2 or 3 marks the alert as success in the Destination Member Status for that connect member.

5. If the user presses 1, the message will repeat.

6. If the user presses 2, the next alert message will be heard, or if there are no further alert messages, the end of session message will occur and the board will hang up the phone.

7. If the user presses 3, the end of session message will occur.

End of alert session.

If the user enters a number other than 1, 2, or 3 when prompted, the current alert message will be terminated and the whole alert message will be repeated within 5 seconds. The digit entered will be ignored. The correct digit should be reentered. The user must enter a 2 or 3 to acknowledge the message, or the board will mark the attempt as Failed and disconnect.

If the user enters the prompt digit or password digits before the board has finished the previous message, the message will be chopped immediately and a new message corresponding to the action chosen will occur.

As previously mentioned, alerts can be delivered to a pager. Each pager can only receive one alert per call. The sequence is listed below.

1. When an alert is sent to a pager, the pager will display:
   the five digit server ID followed by—and three digits
   For example:
   12345-001 This indicates that server 12345, has error number 1.

2. The error should be looked up in a spec provided to the user.

When a remote console receives an alert a windows application or the like can create a window that describes the alert. Effecting at least simple versions of this operation are well within the ability of those skilled in the art.

Listed below are examples of how the board 13 can announce the time, date and system ID.

| Time | |
|---|---|
| 0:0 | Twelve A.M. |
| 0:30 | Twelve thirty A.M. |
| 5:00 | Five A.M. |
| 6:06 | Six O six A.M. |
| 9:10 | Nine ten A.M. |
| 10:15 | Ten fifteen A.M. |
| 11:45 | Eleven forty five A.M. |
| 12:00 | Twelve P.M. |
| 12:22 | Twelve twenty two P.M. |
| 13:35 | One thirty five P.M. |
| 22:30 | Ten Thirty P.M. |
| 23:59 | Eleven fifty nine P.M. |

| Date | | |
|---|---|---|
| Date: | U.S.A. | European |
| 1/1 | January one | One January |
| 7/29 | July twenty nine | Twenty nine July |
| 8/17 | August seventeen | Seventeen August |
| 9/21 | September twenty one | Twenty one September |
| 10/5 | October five | Five October |
| 10/6 | October six | Six October |
| 11/20 | November twenty | Twenty November |
| 12/24 | December twenty four | Twenty four December |

-continued

| System ID | |
|---|---|
| 12045 | One two zero four five |

| Voice Message Number | |
|---|---|
| 125 | one twenty five |
| 200 | two hundred |
| 53 | fifty three |
| 105 | one oh five |
| 100 | one hundred |

Embodiments of the present invention may generate alert messages on board 13. The following table depicts six example board-generated alerts and their meanings.

| Object | Attribute | Meaning | In-Band | Out-of-Band |
|---|---|---|---|---|
| System S/W | Watchdog | Sys. no longer communicating with sys. software. | | X |
| System S/W | Interface Fail | Sys. software failed to complete a command to board or in-band alert failed. | | X |
| System H/W | Power Fail | Sys. power is bad. | | X |
| System H/W | Reset | Sys. reset detected. | | X |
| System Mgr H/W | Interface Fail | BMIC device no longer functioning. | | X |
| System Mgr H/W | Comm Fail | External modem failure. | X | |
| System Mgr H/W | Battery Fail | board's battery is no longer functional. | X | X |

Figure 4:
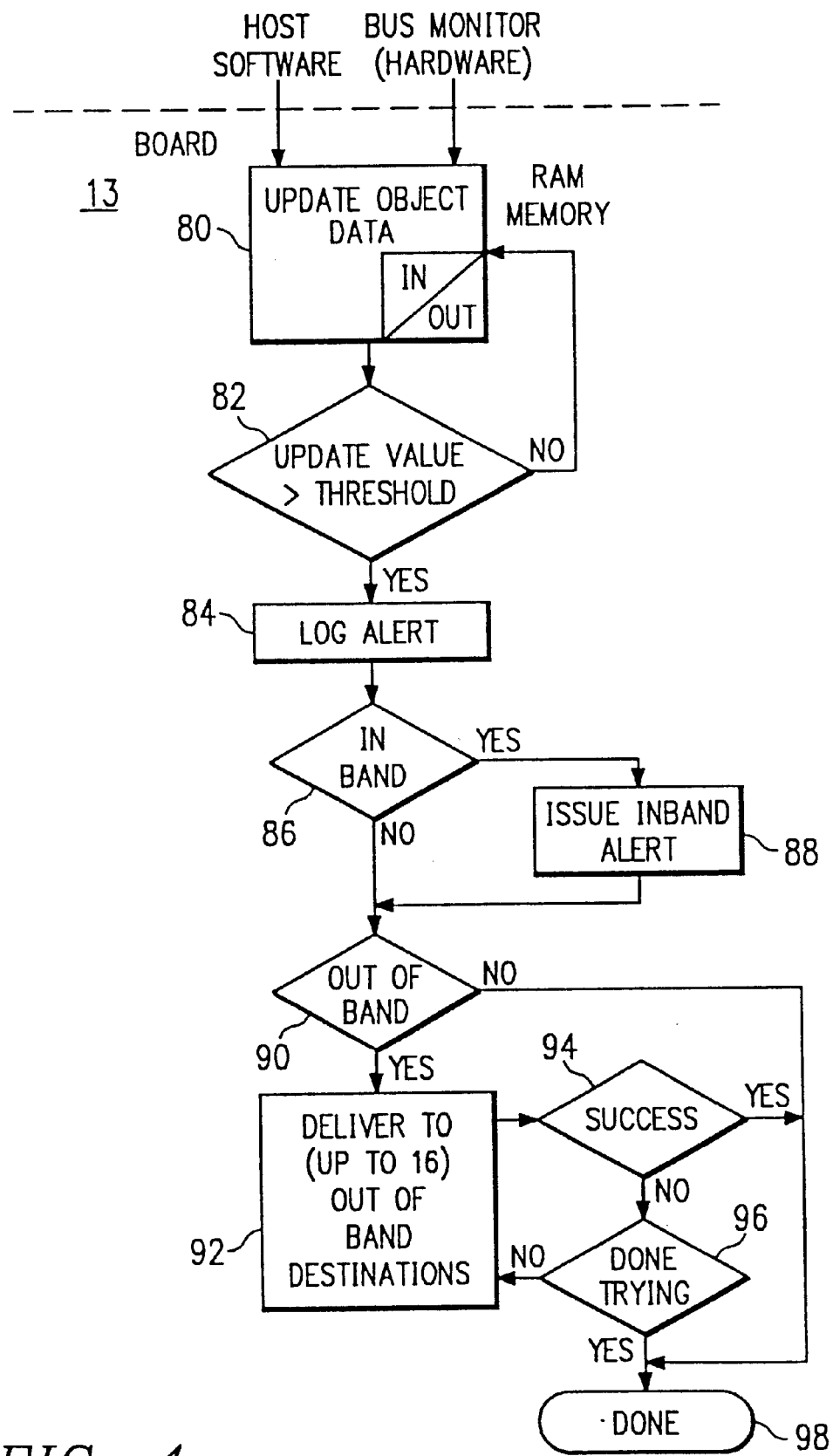
FIG. 4 is a flow chart depicting the logic employed in an embodiment of the present invention.

Referring now to FIG. 4, there is shown a flow chart illustrating steps in the operation of an embodiment of the present invention. At the top of the chart it may be seen that information may come to the board 13 from either host software or bus monitoring. This information can be used to update a portion of random access memory if the information is, e.g., greater than a threshold value. This portion of the process of the present invention is indicated by blocks 80, 82 and 84 in the flow chart of FIG. 4. If in-band alert delivery is appropriate, an in-band alert may be issued as previously discussed (blocks 86, 88). If out-of-band alert delivery is appropriate, out-of-band alerts may be issued as also previously discussed (blocks 90, 92). Retrying as discussed herein above is depicted by blocks 94, 96 with respect to out-of-band delivery. Similar retrying could be effected in in-band delivery in embodiments of the present invention, as previously discussed. Once delivery is completed, the process is done (block 98).

Those skilled in the art should now appreciate that the present invention provides an in-band out-of-band alert delivery system that is much improved over prior art alert delivery systems. The alert delivery system according to the teachings of the present invention is based upon a very effective underlying algorithm which effects persistent retrying and alert delivery to a number of different types of alert receivers. The alert delivery system according to the teachings of the present invention is well suited to delivery alerts with respect to EISA-based components in data communication network environments.

Those skilled in the art will recognize that many modifications and variations besides those specifically mentioned may be made in the techniques described herein without departing substantially from the concept of the present invention. Accordingly, it should be clearly understood that the forms of the invention as described herein are exemplary only and are not intended as a limitation on the scope of the invention.

What is claimed is:

1. A method of operating a computer network server that is coupled to a computer network, the computer network having at least one in-band communication channel, the method comprising:

monitoring a plurality of variable physical attributes of the computer network server and the network;

alerting a first remote console, via one of the in-band channels in the computer network, when one of the monitored physical attributes falls within a predetermined range;

in response to the alerting, providing signals to remotely control the computer network server via a first communication channel of the computer network;

storing histories of functions performed by the computer network server; and sending asynchronous communications over a second communication path that is independent of the at least one in-band communication channel of the network, to at least one first remote console.

2. The method of claim 1 wherein the computer network server employs at least one extended industry standard architecture (EISA) bus and wherein the act of storing histories comprises storing histories of functions performed by an EISA system board.

3. The method of claim 1 wherein the monitoring and alerting acts are performed by a system manager circuit.

4. The method of claim 3 wherein the system manager circuit is a circuit card including a plug for detachably inserting the circuit card into a system board.

5. The method of claim 1 wherein the act of sending asynchronous communications is performed by a network interface adapter circuit.

6. The method of claim 5 wherein the network interface adapter circuit is a circuit card including a plug for detachably inserting the circuit card into the system board.

7. The method of claim 1 wherein act of alerting a first remote console comprises alerting at least one remote console over the communication network and a second remote console via a second communication path.

8. A computer network server for coupling to a computer network, the computer network having at least one in-band communication channel, the computer network server comprising:

means for monitoring a plurality of variable physical attributes of the computer network server and the network;

means for alerting a first remote console, via one of the in-band channels in the computer network, when one of the monitored physical attributes falls within a predetermined range;

means for providing signals to remotely control the computer network server via a first communication channel of the computer network;

means for storing histories of functions performed by the computer server network; and means for sending asynchronous communications over a second communication path that is independent of the at least one in-band communication channel of the network, to at least one first remote console.

9. A computer network server coupled to a computer network, the computer network having at least one in-band communication channel and wherein the computer network server employs at least one extended industry standard architecture (EISA) bus, the computer network server comprising:

at least one system mother board having at least one system bus, the system bus having a width of at least 32 bits and wherein the system bus conforms to an EISA standard;

means for monitoring a plurality of variable physical attributes of the computer network server and the network;

means for alerting a first remote console, via one of the in-band channels in the computer network, when one of the monitored physical attributes falls within a predetermined range;

means for coupling the system manager circuit to a first communication channel of the network for providing the signals to remotely control the computer network server;

means for storing histories of functions performed by the EISA system board; and means for sending asynchronous communications over a second communication path that is independent of the at least one in-band communication channel of the network, to at least one first remote console.

10. The system of claim 8 wherein the means for sending asynchronous communications comprises an EISA network interface adapter circuit.

11. The system of claim 10 wherein the network interface adapter circuit comprises a circuit card that includes a plug for detachably inserting the circuit card into the system board.

12. The system of claim 9 wherein the means for monitoring comprises a circuit card which includes a plug for detachably inserting the circuit card into the system board.

13. The system of claim 9 further comprising a disk array controller device.

14. The system of claim 13 wherein the disk array controller device comprises a circuit card detachably connected to the system board.

15. The system of claim 9 wherein the means for alerting a first remote console alerts at least one remote console over the communication network and a second remote console via a second communication path.

16. The system of claim 9 wherein the means for alerting and the means for monitoring comprise a system manager circuit.

17. A computer network server comprising:

means for monitoring a system bus for at least one physical attribute of the computer network server;

means for updating a stored set of object data contained within the computer network server;

means for updating a value threshold for the at least one monitored physical attribute;

means for determining if an alert is required based on a comparison between the physical attribute and the threshold value at least in part based upon the updated stored set of object data;

means for determining if an in-band alert is required;

means for issuing an in-band alert to a first predetermined console if an in-band alert is required;

means for determining if an out-of-band alert is required;

means for issuing an out-of-band alert to a first of a plurality of predetermined out-of-band devices if an out-of-band alert is required;

means for determining whether the out-of-band alert issued to the first of a plurality of the predetermined out-of-band devices was received;

means for issuing an out-of-band alert to a next of the plurality of the predetermined out-of-band devices if the out-of-band alert issued to the first of a plurality of the predetermined out-of-band devices is determined to not have been received; and means for receiving asynchronous data from one of the plurality of predetermined out-of-band devices in order to perform at least one of reprogramming the computer network server and responding to the alert.

18. The computer network server of claim 17 wherein the means for issuing an out-of-band alert comprises means for sending a communication signal to a device selected from the group of a pager, a telephone, a personal computer and a mobile telephone.

* * * * *